United States Patent
Manderla et al.

(10) Patent No.: US 11,358,612 B2
(45) Date of Patent: Jun. 14, 2022

(54) METHOD FOR CONTROLLING AN AUTOMATED OR AUTONOMOUS LOCOMOTIVE DEVICE, AND EVALUATION UNIT

(71) Applicant: Robert Bosch GmbH, Stuttgart (DE)

(72) Inventors: Maximilian Manderla, Ludwigsburg (DE); Philip Holzwarth, Stuttgart (DE); Roktim Bruder, Stuttgart (DE); Steffen Joos, Walheim (DE); Thomas Specker, Leonberg (DE); Stefan Grodde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 16/722,112

(22) Filed: Dec. 20, 2019

(65) Prior Publication Data
US 2020/0198657 A1   Jun. 25, 2020

(30) Foreign Application Priority Data

Dec. 21, 2018  (DE) .......................... 102018222783.7

(51) Int. Cl.
*B60W 60/00*   (2020.01)
*G05D 1/02*    (2020.01)

(52) U.S. Cl.
CPC ......... *B60W 60/001* (2020.02); *G05D 1/0212* (2013.01); *B60W 2520/06* (2013.01); *B60W 2710/20* (2013.01); *G05D 2201/0213* (2013.01)

(58) Field of Classification Search
CPC combination set(s) only.
See application file for complete search history.

(56) References Cited

U.S. PATENT DOCUMENTS

| | | | |
|---|---|---|---|
| 2012/0150324 A1* | 6/2012 | Brand .................. | G05B 13/048 700/29 |
| 2016/0077505 A1* | 3/2016 | Dirkx .................... | G05B 19/19 700/275 |
| 2020/0341476 A1* | 10/2020 | Wuthishuwong ....... | G01S 17/89 |

FOREIGN PATENT DOCUMENTS

DE       102013214225 A1    1/2015

OTHER PUBLICATIONS

Biagiotti, Luigi; Zanasi, Roberto. "Time-optimal regulation of a chain of integrators with saturated input and internal variables: an application to trajectory planning". Sep. 1-3, 2010. 8th IFAC Symposium on Nonlinear Control Systems. (Year: 2010).*

(Continued)

*Primary Examiner* — Jeff A Burke
*Assistant Examiner* — Madison B Emmett
(74) *Attorney, Agent, or Firm* — Norton Rose Fulbright US LLP; Gerard Messina

(57) ABSTRACT

A method for controlling an automated or autonomous locomotive device, including automatically ascertaining a deviation from a predefined trajectory, the deviation requiring a return of the locomotive device to the predefined trajectory; automatically calculating a jerk as an input variable, as a function of the deviation from the predefined trajectory; automatically calculating an unconstrained correcting variable for the return to the predefined trajectory, as a function of a weighted sum that includes a weighted summand of the input variable and a weighted summand of the state for the return path; automatically calculating a constrained correcting variable regarding the jerk; the unconstrained correcting variable being manipulated via a cascade that includes multiple stages having one saturation function per stage; integrating the constrained correcting variable, to obtain a constrained return trajectory to the (Continued)

predefined trajectory; automatically steering the locomotive device to the predefined trajectory by way of the constrained return trajectory.

20 Claims, 7 Drawing Sheets

(56) References Cited

OTHER PUBLICATIONS

Chen, Jianyu; Zhan, Wei; Tomizuka, Masayoshi. "Constrained Iterative LQR for On-Road Autonomous Driving Motion Planning". 2017. 2017 IEEE 20th International Conference on Intelligent Transportation Systems (ITSC). (Year: 2017).*
Goode, Brian; Kurdila, Andrew; Roan, Mike. "A Graph Theoretical Approach Toward a Switched Feedback Controller for Pursuit-Evasion Scenarios". Jun. 29-Jul. 1, 2011. 2011 American Control Conference. (Year: 2011).*
Joos, Steffen; Bitzer, Matthias; Karrelmeyer, Roland; Graichen, Knut. "Online-trajectory planning for state- and input-constrained linear SISO systems using a switched state variable filter". 2017. IFAC PapersOnLine 50-1 (2017). (Year: 2017).*
Gutjahr et al. English translation of the description of DE 10 2013 214 225 A1. Jan. 22, 2015 (Year: 2015).*
Joos, Steffen; Bruder, Roktim; Specker, Thomas; Bitzer, Matthias; Graichen, Knut. "Kinematic real-time trajectory planning with state and input constraints for the example of highly automated driving". Oct. 9, 2019. IEEE. (Year: 2019).*
Joos, S. et al., "Prioritization-Based Switched Feedback Control for Linear SISO Systems With Time-Varying State and Input Constraints", in European Control Conference (ECC), Limassol, Cyprus, 2018, pp. 2935-2940.
Lunze, J: Regelungstechnik 2: Mehrgrößensysteme Digitale Regelung, [Control Engineering 2: Multivariable Systems Digital Control], Springer Publishing House, 2013 (Chapters 6 and 7, pp. 237-331).

* cited by examiner

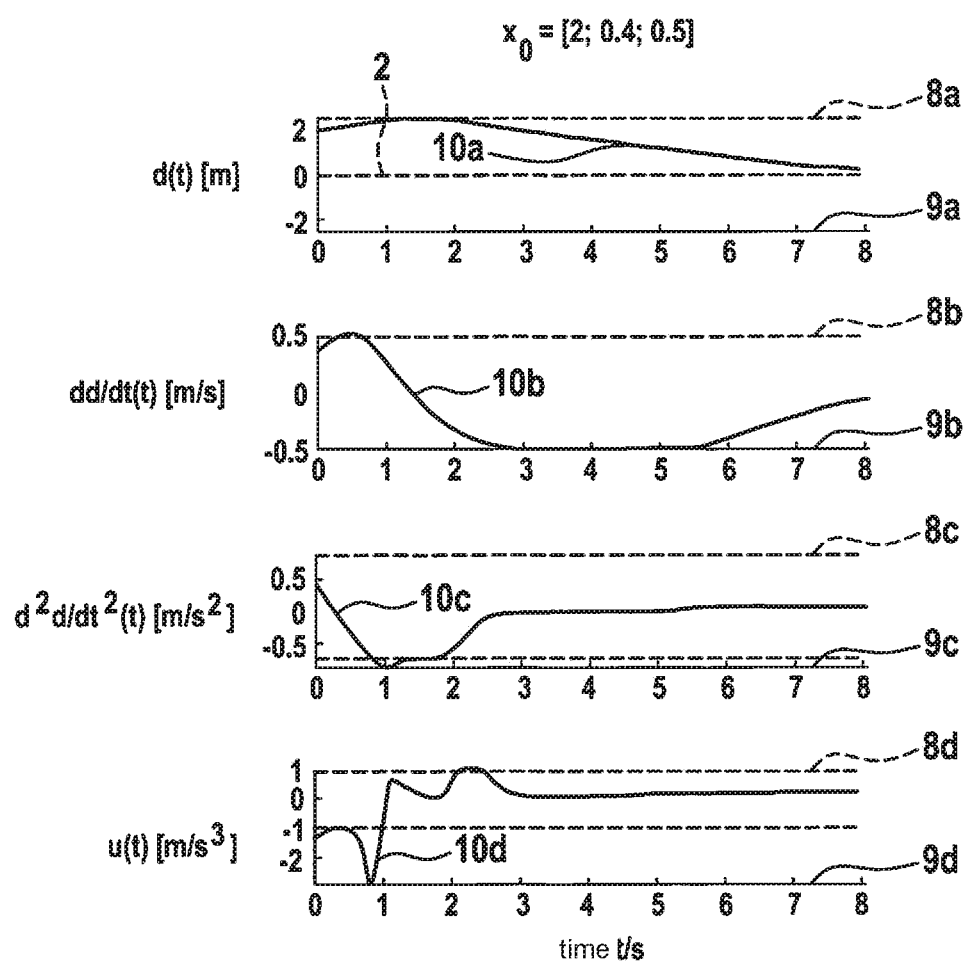

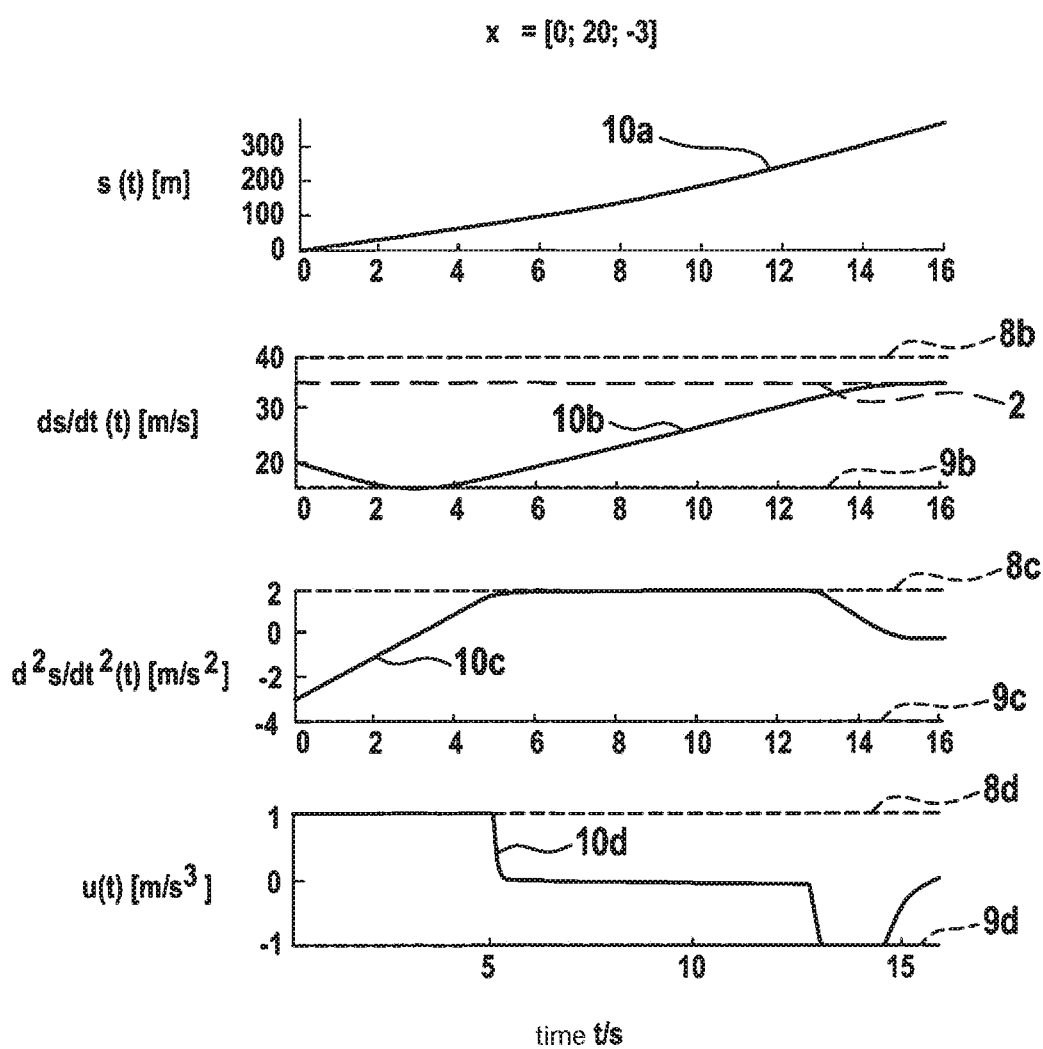

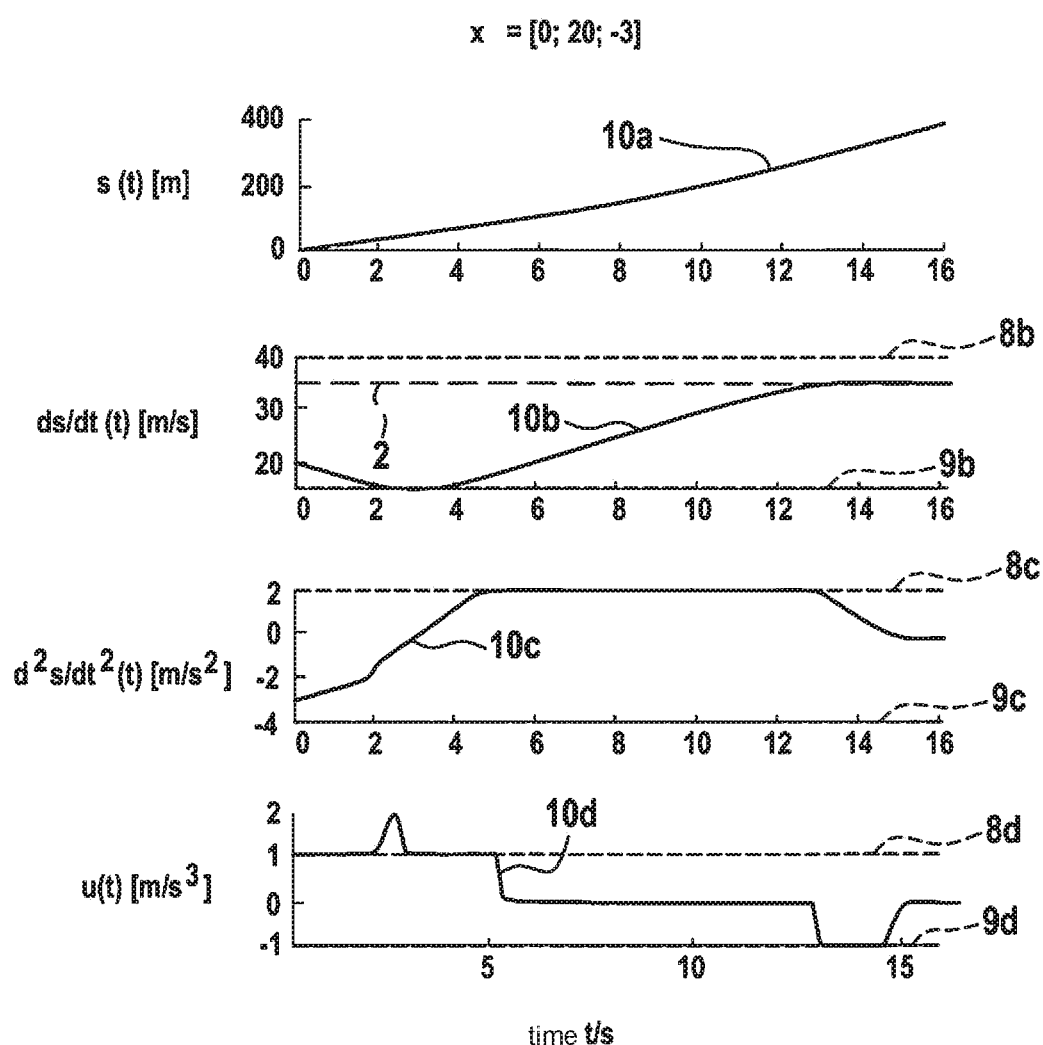

METHOD FOR CONTROLLING AN AUTOMATED OR AUTONOMOUS LOCOMOTIVE DEVICE, AND EVALUATION UNIT

CROSS REFERENCE

The present application claims the benefit under 35 U.S.C. § 119 of German Patent Application No. DE 102018222783.7 filed on Dec. 21, 2018, which is expressly incorporated herein by reference in its entirety.

FIELD

The present invention relates to a method for controlling an automated or autonomous locomotive device, as well as to an evaluation unit of a locomotive device.

BACKGROUND INFORMATION

With the continuous evolution of highly automated and autonomous vehicles, the relevance of trajectory planning is also growing. In this context, the requirements for trajectory planning may be varied. They extend from the planning of a comfortable trajectory to the lane change on the highway, up to the safety-related avoidance maneuver in urban and rural traffic. Thus, high demands, such as the adherence to particular comfort or safety criteria or the prediction of critical situations, are often placed on the trajectory planning as a function of the request. In addition, it must be possible to compute the trajectories in real time, since they must followed during current vehicle operation. In order to satisfy this requirement, polynomial-based approaches are discussed in the relevant literature. Polynomial-based design approaches do possess real-time capability, but have the disadvantage that constraints may not be taken explicitly into account in a simple manner. In addition, the asymmetric driving behavior of a person may only be simulated with difficulty, by polynomials of low order over a relatively long time horizon. For example, a human driver initiates a lane change more dynamically than he/she ends it. Model predictive control (MPC) constitutes an option for integrating constraints and asymmetric behavior in the trajectory planning. In this connection, however, since optimization problems must be solved continuously in view of constraints, MPC-based planning requires very high computing power, in order to be real-time capable. However, given the standard capacity utilization of control units, which are used in today's vehicles, such high computing power may not be ensured.

SUMMARY

According to a first aspect, the present invention relates to a method for controlling an automated or autonomous locomotive (locomotion, transport) device. In the spirit of the present invention, automobiles, in particular, passenger cars and/or cargo trucks and/or motorcycles and/or airplanes and/or ships come into consideration. A locomotive device operable in an "autonomous" and/or "automated" manner may presently be understood as at least a locomotive device, which is able, for example, using an evaluation unit, to plan a trajectory independently and additionally move independently on this trajectory. In a first step, the method of the present invention includes ascertaining a deviation, e.g., of a path, which requires a return to a predefined trajectory. Such ascertainment of the deviation may be carried out, in particular, by the locomotive device, for example, using an evaluation unit, for example, a CPU and/or a microcontroller or an electronic control unit. Further dynamic system variables currently available, such as the speed and/or the acceleration, which may be ascertained by a conventional locomotive-device sensor system, may also be taken into account for the ascertainment of the deviation. A "predefined trajectory" may be understood as a global trajectory, which runs, for example, on a reference line or reference curve of a Frenet coordinate system. The global trajectory may be planned, for example, at or prior to the start of the trip and does not consider any eventualities, which, due to different routing or due to obstacles, would signify a necessity of deviating from this trajectory. A deviation and/or necessity of a return to this predefined trajectory may occur, for example, on the basis of sensory data of the vehicle, which come, for example, from an ultrasonic sensor and/or a camera and/or a lidar sensor and/or a radar sensor and/or an accelerometer and/or a speedometer. A deviation may be justified by an obstacle, which means that the locomotive device must deviate from the predefined trajectory. The obstacle may be detected or ascertained sensorially. In addition, because of the ascertained deviation, in particular, a roadway corridor is formed, which results due to obstacles and roadway boundaries. In response to the ascertainment of a deviation, a jerk in the form of an input variable is automatically computed as a function of the deviation. For example, a deviation from the predefined reference trajectory, e.g., a distance, and/or a current acceleration and/or a current velocity of the locomotive device may be utilized for calculating the jerk. Starting from the input variable, an unconstrained correcting variable is automatically computed for returning to the predefined trajectory. Presently, a "correcting variable" is understood, in the control-engineering sense, as an output variable of a utilized control element (for example, an evaluation unit);

A targeted intervention in the controlled member of the system, that is, of the locomotive device, is able to take place via the output variable and/or correcting variable, on the basis of the input variable (the jerk). However, the unconstrained correcting variable does not act directly upon the system. On the contrary, further manipulation steps take place, which are explained below. The unconstrained correcting variable for returning to the predefined trajectory is calculated as a function of a weighted sum that includes a weighted summand of the input variable and a weighted summand of a state and/or weighted summands of further states of the return path. In this connection, the summand of the input variable may also have a weighting of zero. In addition, further states may be considered. In particular, each state receives a weighted summand, in order to compute the unconstrained correcting variable. The unconstrained correcting variable is limited by the saturation cascade. After thrice integrating an output value obtained in this manner, with respect to time, a state may be obtained, which acts directly upon the locomotive device. For the next instant, this operation is repeated, starting from the current state, etc. For example, the velocity, the jerk, the acceleration and/or the position of the locomotive device come into consideration as a "state." In this connection, the state is calculated, in particular, as a function of the deviation from the predefined trajectory. For example, the state may be ascertained sensorially. In particular, for a specific lateral or longitudinal or vertical motion of the locomotive device, assuming that the enumerated motions are decoupled from each other, in the case of the deviation, the state is ascertained for the respective acceleration, velocity and position of the vehicle and transformed to a state space. For example, the planning of the unconstrained correcting variable may be regarded as a state return path, which means that starting from an initial condition, the locomotive device may be stabilized asymptotically so as to approach the predefined reference trajectory. For example, a return matrix may be calculated for this with the aid of pole selection and/or a linear quadratic regulator (LQR) method. Based on the use of the weighted sum and its simple arithmetic processing, a required computing speed or power may be reduced by a factor of 10 to 100 in comparison with predictive modeling approaches. In a subsequent step, a constrained correcting variable with regard to the jerk is computed automatically. In this connection, the unconstrained correcting variable is manipulated via a cascade of a plurality of stages. For this, a saturation function regarding a dynamic system state is provided for each stage of the cascade. The saturation function constitutes a constraint, which is undertaken within the stage of the cascade with regard to a dynamic system state. A dynamic system state may contain, for example, a jerk, which, according to the physical definition, includes the third derivative of the distance with respect to time. In this connection, a deviation from a predefined reference trajectory may be ascertained, in particular, one used for the lateral coordinate. In simplified terms, it may be assumed, in particular, that the lateral and the longitudinal motion of the locomotive device are decoupled; at least a constant longitudinal movement being assumed in the determination of the return trajectory for the lateral movement. In the case of a Frenet coordinate system, the time characteristic of the distance of the predefined trajectory, as well as of the length of the curve of the predefined trajectory, may be used in order to compute, in each instance, a jerk from this. In particular, the characteristic curve of the jerk may be used, in this case, as a correcting variable. Mathematical models, which result from these assumptions, may be transformed, in particular, in a state space. In response to that, the constrained correcting variable is integrated in a time-dependent manner, e.g., integrated three times with respect to time, in order to obtain the constrained return trajectory, that is, which contains the constraint data from the cascade with regard to dynamic system states (e.g., jerk and/or acceleration). In a final step, the locomotive device is automatically steered towards the predefined trajectory by way of a constrained return trajectory. This may be accomplished, e.g., with the aid of a controller. Thus, using the method of the present invention, a jerk is limited to the effect that a comfortable trajectory plan may be carried out. For example, the steps discussed above may be ascertained and carried out by an evaluation unit, for example, a CPU and/or a microcontroller and/or an electronic control unit. Thus, in the preceding, trajectory planning may be provided, which, in comparison with classic planning approaches based on polynomials of higher order, may also be used for asymmetric driving behavior (by taking into account the jerk as an input and output variable) and may take constraints into account.

Preferred further refinements of the present invention are described herein.

According to one advantageous further refinement of the present invention, the dynamic system state includes a jerk and/or a velocity and/or an acceleration and/or a position of the locomotive device. The dynamic system state may relate to, in particular, a longitudinal and/or lateral and/or a vertical trajectory component of the locomotive device. Consequently, all of the relevant, dynamic system states, which are necessary for trajectory planning, may be used within the method of the present invention in a computationally efficient manner.

According to a further advantageous refinement of the method according to the present invention, the constrained return trajectory includes a longitudinal and/or a lateral and/or a vertical component. A vertical trajectory component may then be relevant, in particular, if the locomotive device is an airplane. If the method of the present invention is carried out for a lateral trajectory component, then, in particular, a constant longitudinal velocity is always assumed in spite of the simplified decoupling assumption of the two trajectory components.

According to one advantageous further refinement of the method of the present invention, the cascade may include two to four stages. The cascade ideally includes four stages. Therefore, all of the constraint data (e.g., jerk, acceleration, position and velocity) necessary for the planning of the constrained return trajectory may be considered without requiring a high computing capacity.

According to a further advantageous refinement of the method of the present invention, the saturation function may be ascertained as a function of predefined constraints. In this manner, variant-rich initial conditions for the generation of saturation functions may be set specifically to the need, in order to model asymmetric human driving behavior as realistically as possible. For example, a predefined constraint regarding the position of the locomotive device may include coordinates of a roadside for calculating a limiting corridor. Additionally, or as an alternative, a maximum jerk and/or a maximum acceleration may be predefined as a function of test studies. For example, a maximum jerk and/or a maximum acceleration may be defined, in each instance, as a maximum value, the exceedance of which causes unease in a representative group of test subjects. A current state of the locomotive device (with regard to acceleration and/or position and/or velocity) may be estimated, for example, as a function of corresponding sensorial data of the locomotive device.

According to a further advantageous refinement of the method according to the present invention, the automatic determination of the constraint does not vary with time. In this manner, computing power may be conserved while neglecting the time component.

According to one advantageous embodiment of the method of the present invention, a later step, that is, a manipulation of the correcting variable in a later stage of the cascade, is preferred over an earlier step, that is, a manipulation of the correcting variable in an earlier step of the cascade. In other words, this means that the unconstrained correcting variable passes through individual saturation functions, which may be associated with the constraints of the individual states. If different constraints are competing, that is, there is no physically meaningful solution for all of the constraints, then the constraint, that is, the manipulation, using the saturation function that occurs later in the cascade, is dominant, since this may overwrite the adaptation of the preceding saturation steps. This is also called "prioritization." Due to this, one or more given constraints having a lower priority, such as comfort, may be deliberately violated, it the problem may no longer be solved in view of all of the constraints. This makes the trajectory planning of the present invention, that is, the method of the present invention, highly robust for solving a trajectory planning problem, while at the same time, only a fraction of the computing power of an MPC method is needed.

According to a further advantageous refinement of the method according to the present invention, this includes a step of sensorial detection of an obstacle by the locomotive device. For example, the obstacle may be detected sensorially with the aid of a lidar sensor and/or a camera sensor and/or a radar sensor and/or an ultrasonic sensor. In addition, an obstacle may also be detected on the part of the vehicle, based on received data, for example, real-time traffic information data.

According to a further advantageous refinement of the method according to the present invention, this includes the step of calculating a return matrix, on the basis of which the return trajectory is automatically ascertained with regard to the dynamic system state. In particular, the return matrix may be understood to describe the dynamics of how rapidly the return trajectory is lead back to the predefined reference. For example, the return matrix may be computed prior to the start of the trip, that is, offline. Therefore, the present trajectory planning has real-time capability. Since the return matrices for the method of the present invention do not have to be computed during the trip, this method is sufficiently discrete and efficient with regard to computing power.

The following aspect of the present invention accordingly includes the advantageous embodiments and further refinements having the above-mentioned features, as well as the general advantages of the method of the present invention and the respective technical effects associated with them. In order to prevent repetition, a new listing is therefore omitted.

According to a second aspect, the present invention relates to an evaluation unit of a locomotive device; the evaluation unit being configured to implement a method according to the first aspect of the present invention. In particular, the evaluation unit may be rigidly installed in onboard electronics of the locomotive device. According to the present invention, it is, in particular, not necessary to plan a trajectory, using an external server. In particular, the method of the present invention is so computationally efficient, that it may easily be implemented in an evaluation unit of a locomotive device.

BRIEF DESCRIPTION OF THE DRAWINGS

Below, exemplary embodiments of the present invention are described in detail with reference to the figures.

FIG. 5*b* shows a further illustration of a cascade for the planning of a lateral trajectory.

FIG. 6*a* shows an illustration of a cascade for the planning of a longitudinal trajectory.

FIG. 6*b* shows a further illustration of a cascade for the planning of a longitudinal trajectory.

DETAILED DESCRIPTION OF EXAMPLE EMBODIMENTS

Figure 1:
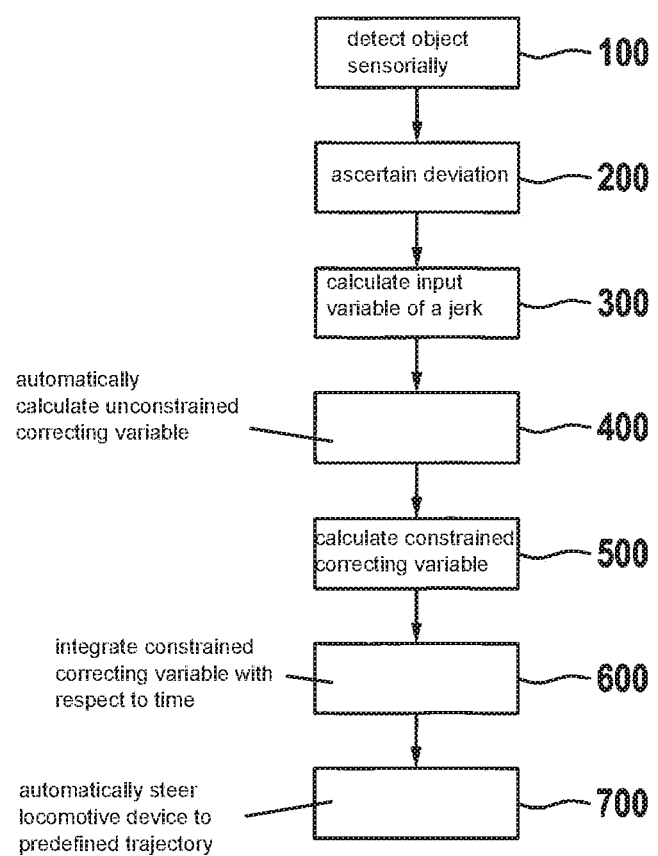
FIG. 1 shows a flow chart of a variant of the method according to the present invention.
Figure 2:
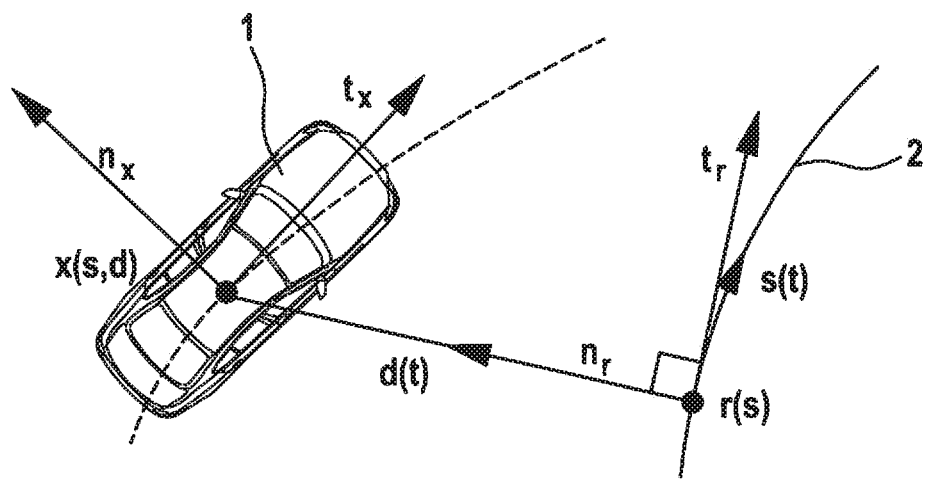
FIG. 2 shows an illustration of a Frenet coordinate system.

FIG. 1 illustrates a flow chart of a variant of a method according to the present invention. In a first step 100, in particular, an obstacle is detected sensorially by locomotive device 1. In response to that, in a second step 200, a deviation, which requires a return to a predefined trajectory 2 of locomotive device 1, is ascertained by locomotive device 1. A trajectory, which is necessary for this, is planned in the Frenet coordinate system. Such a coordinate system, including locomotive device 1 and predefined trajectory 2, is shown in FIG. 2. This coordinate system is kinematically bound to a predefined trajectory 2 by base point r(s) and describes the setpoint position and setpoint orientation of locomotive device 1 at any time with respect to an inertial system. In this context, longitudinal coordinate s(t) describes the arc length along predefined trajectory 2. The distance of locomotive device 1 perpendicular to predefined trajectory 2 corresponds to lateral coordinates d(t). A triple integrator is used to describe the dynamics (that is, the deviation from predefined trajectory 2) of locomotive device 1 in such a Frenet coordinate system; the jerk being viewed as an input variable of the system. As a result:

$$\frac{d^3 d(t)}{dt^3} = \dddot{d}(t) = u_{lat}(t), \quad (1)$$

$$\frac{d^3 s(t)}{dt^3} = \dddot{s}(t) = u_{long}(t). \quad (2)$$

Thus, in a third step 300, an input variable of a jerk is calculated. In this case, t is the time. In this context, it is accordingly assumed that the lateral and longitudinal motions are decoupled. The models are then transformed to the state space, using the state $x(t)=[d(t)\ \dot{d}(t)\ \ddot{d}(t)]^T$ or $x(t)=[s(t)\ \dot{s}(t)\ \ddot{s}(t)]^T$. Given the initial condition $x_0=x(0)$, the differential equation system according to equation (3) is $$\dot{x}(t) = \underbrace{\begin{bmatrix} 0 & 1 & 0 \\ 0 & 0 & 1 \\ 0 & 0 & 0 \end{bmatrix}}_{A} x(t) + \underbrace{\begin{bmatrix} 0 \\ 0 \\ 1 \end{bmatrix}}_{B} u_{\{lat,long\}}(t), x(t_0) = x_0 \quad (3)$$

The trajectory planning may now take place on the basis of the linear state space representation of the longitudinal and lateral dynamics. According to FIG. 3, the problem of the unconstrained trajectory planning is initially solved in a first step, before state constraints and correcting variable constraints are subsequently taken into account in a downstream step. In this context, the constraints may be derived, in particular, directly with regard to technical requirements in view of a maximum jerk, a maximum lateral acceleration, or the like. In a fourth step 400, an unconstrained correcting variable is calculated automatically as a function of a weighted sum including weighted summands of the states. In this connection, for a highly dynamic trajectory, the states may be weighted more heavily in the calculation of the state return path with the aid of LQR methods. If, however, a more comfortable trajectory having a lower jerk is needed, then the weighting of the jerk may be selected to be higher than the weighting of the states.

In this connection, for the planning of a return trajectory, a state return path $u_c(t)=-K(x^*-x(t))$ is calculated, which, starting out from an initial condition $x(0)=x_0$, stabilizes system 6 so as to approach a predefined trajectory 2 asymptotically, which also means: $x(t) \to x^*$, $t \to \infty$. For this, state x(t) must be completely known, which, however, is fulfilled for the purely model-based planning task. In a fourth step

400, a calculation of return matrix K is made, which is carried out with the aid of a pole selection or the LQR method, with a finite or infinite horizon, or with the aid of similar methods. In this context, the unconstrained dynamics of the return trajectory may be set as a function of the position of the poles or weighting of the individual states. For a more detailed description of this action, reference is made to Lunze, J: Regelungstechnik 2: Mehrgrößensysteme Digitale Regelung, [Control Engineering 2: Multivariable Systems Digital Control], Springer Publishing House, 2013.

Figure 4:
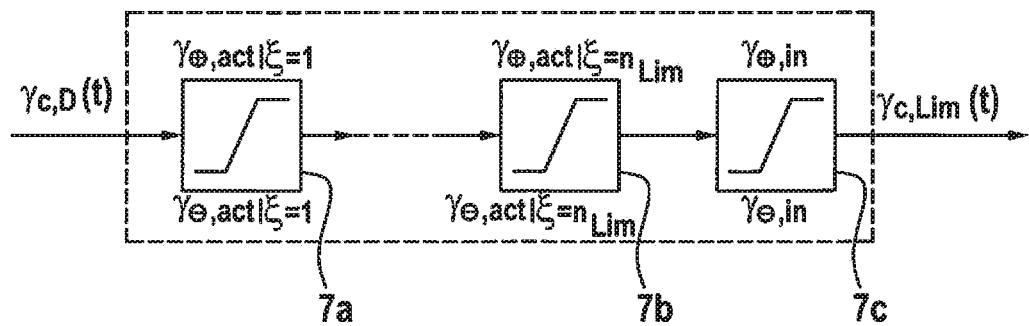
FIG. 4 shows an illustration of a cascade of the method according to the present invention.

In a fifth step 500, a constrained correcting variable regarding the dynamic system state is calculated automatically as a function of a predefined constraint and a current state of locomotive device 1. To this end, the unconstrained correcting variable with regard to the dynamic system state is varied as a function of a predefined constraint. In other words, the correcting variable characteristic from the unconstrained correcting variable is adapted in such a manner, that constraints with regard to the correcting variable and the states may be adhered to. This is accomplished, in particular, on the basis of a cascade of saturation elements having state-dependent, upper and lower constraints, as is shown, for example, in FIG. 4. In this context, the order of these elements or stages in the cascade represents the prioritization of the corresponding constraints. The closer the constraint is to the output of the cascade, the higher the corresponding priority is. In FIG. 4, a cascade having different stages 7a through 7c is shown as an example. In this connection, e.g., the priorities become higher from first state $x_1$ along the integrator chain, up to output u. If the constraints for this system are prioritized according to this, then the order is: 1. u, 2. $x_3$, 3. $x_2$, 4. $x_1$. In this connection, u is defined as jerk, $x_4$ as acceleration, $x_2$ as velocity and $x_1$ as position; four describing the highest and one describing the lowest priority. However, in general, the order of saturation may be selected freely. An advantage of prioritizing the constraints is that if it should no longer be possible to physically adhere to all of the constraints, then the constraint having the lowest priority is automatically violated, in order to be able to find a solution, nevertheless. Specifically, this means that, for example, a comfort criterion is violated in order to adhere to a safety criterion.

In this context, the calculation of the state-dependent saturation is as follows: Initially, the time-dependent and polytopic state constraints $$P=\{x\in \mathbb{R}^3 | Fx(t)-g(t)\leq 0\} \quad (4)$$

are defined for the states with $F\in \mathbb{R}^{n_c \times 3}$, $g\in \mathbb{R}^{n_c}$, where $n_c$ is the number of state constraints. The time-dependent correcting variable constraint is expressed by equation (5)

$$u_{min}(t)\leq u(t)\leq u_{max}(t). \quad (5)$$

In this connection, $u_{min}$ is the minimum jerk, and $u_{max}$ is the maximum jerk. The calculation of all of the correcting variables for adhering to the upper and lower constraints is carried out, using equations (6) and (7)

$$\gamma_\oplus(t)\in\{\gamma_{\oplus,in},\gamma_{\oplus,1},\ldots,\gamma_{\oplus,n_{c,+}}\}, \quad (6)$$

$$\gamma_\ominus(t)\in\{\gamma_{\ominus,in},\gamma_{\ominus,1},\ldots,\gamma_{\ominus,n_{c,-}}\}, \quad (7)$$

for the saturation cascade having the unconstrained correcting variable as an input, in accordance with the action described in Joos, S.; Bitzer, M.; Karrelmeyer, R.; Graichen, K.: "Prioritization-based switched feedback control for linear SISO systems with time-varying state and input constraints" in European Control Conference (ECC), Limassol, Cyprus, 2018, pp. 2935-2940, and in view of the state and correcting variable constraints from equations (4) and (5), defined in advance. In this connection, $\gamma_{\oplus,in},\gamma_{\oplus,1},\ldots,\gamma_{\oplus,n_{c,+}}$ are the calculated maximum values of the saturation cascade. $\gamma_{\ominus,in},\gamma_{\ominus,1},\ldots,\gamma_{\ominus,n_{c,-}}$ are the calculated minimum values of the saturation cascade. In a further step, the unconstrained correcting variable is adapted in accordance with the prioritization of the constraints in the cascade. If the constraints are not active at any moment, the cascade does not change the unconstrained correcting variable. The resulting correcting variable is then applied to the model of the longitudinal and lateral dynamics according to equation (3). The constrained correcting variable from the output of the saturation cascade is subsequently integrated three times, in order to obtain the constrained trajectory (step 600). Finally, in a seventh step 700, locomotive device 1 is automatically steered back to predefined trajectory 2 via the constrained return trajectory regarding the dynamic system state.

Figure 3:
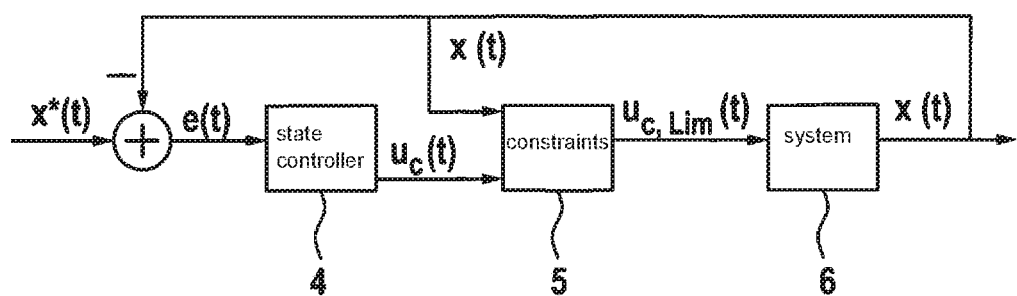
FIG. 3 shows an illustration of the processing of a state of the method according to the present invention.

FIG. 3 shows a flow chart including a state controller 4, consideration of constraints 5, and a system 6. The input variable of state controller 4 is initially the deviation of the setpoint state and actual state. The output variable (jerk) of state controller 4 is the unconstrained correcting variable, which is constrained by taking into account constraints 5.

Consequently, a constrained correcting variable is obtained, which is integrated three times, in order to obtain the constrained return trajectory, which then acts upon system 6, that is, locomotive device 1.

FIG. 4 shows a cascade according to Joos, S.; Bitzer, M.; Karrelmeyer, R.; Graichen, K.: "Prioritization-based switched feedback control for linear SISO systems with time-varying state and input constraints" in European Control Conference (ECC), Limassol, Cyprus, 2018, pp. 2935-2940. In this connection, stages 7a, 7b, 7c of the cascade are shown. In this case, stage 7b is prioritized over stage 7a, and stage 7c is prioritized over stage 7b. In other words, a constraint of stage 7a is removed in stage 7b, if, on the basis of the cascade, an unsolvable task of the correcting variable present in the cascade would arise.

Figure 5A:
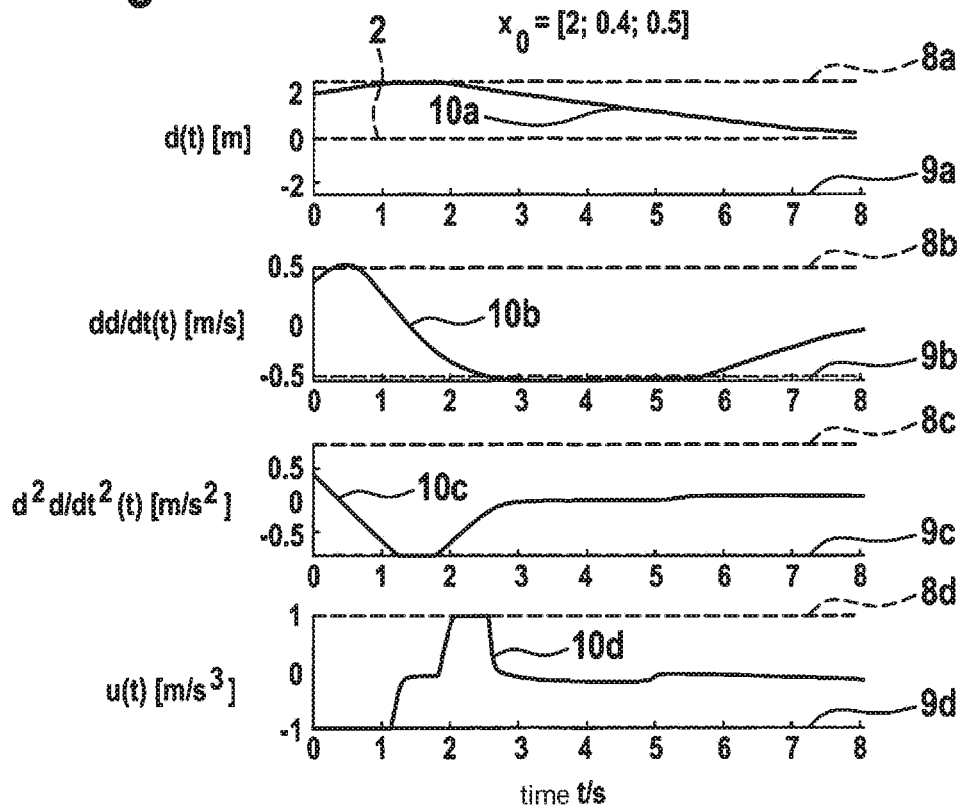
FIG. 5*a* shows an illustration of a cascade for the planning of a lateral trajectory.

FIG. 5a shows an illustration of a solution of an LQR method for planning a lateral trajectory in view of upper and lower constraints 8a through 8d and 9a through 9d, respectively. In this connection, the resulting local trajectory of the state of position 10a is shown in the uppermost illustration for the position of locomotive device 1. In addition, predefined, global trajectory 2 is illustrated as a dashed line. In this case, the characteristic of the resulting local trajectory, that is, of the altered return trajectory, approaches predefined trajectory 2 asymptotically. In this connection, the following prioritization for the dynamic system states is given: 1. jerk, 2. acceleration, 3. velocity, 4. position. In other words, this means that the jerk of locomotive device 1 has the highest priority and the position of locomotive device 1 has the lowest priority. In this case, the first through fourth states 10a to 10d are constrained from the top to the bottom. In this connection, FIG. 5b includes a different prioritization; the position having the highest priority, the velocity having the second highest priority, the acceleration having the third highest priority, and the jerk having the fourth highest priority.

FIG. 6a shows the solution of an LQR method for planning a longitudinal trajectory in view of upper and lower constraints 8a through 8d and 9a through 9d, respectively. In this connection, first state 10a is unconstrained with regard to the position. Second state 10b approaches predefined trajectory 2 asymptotically. In this case, upper constraints 8b through 8d and lower constraints 9b through 9d of states 10a through 10d are shown, as well. The prioritization in FIG. 6a is as follows: 1. jerk, 2. acceleration, 3. velocity. FIG. 6b shows trajectory planning regarding a state 10a through 10d for the longitudinal trajectory planning. In this case, the first through third states 10a through 10c are prioritized as follows: 1. velocity, 2. acceleration, and 3. jerk.

Figure 7:
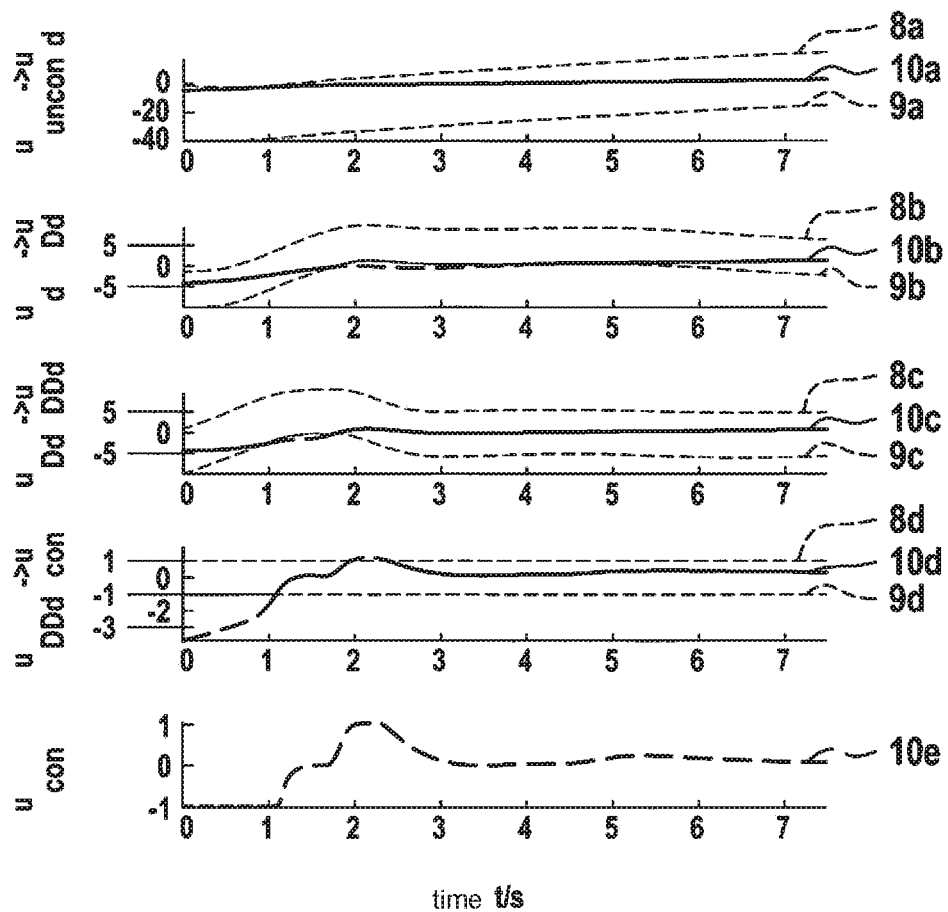
FIG. 7 shows another illustration of a cascade for trajectory planning.

FIG. 7 shows a further variant of a saturation cascade. In this case, the unconstrained correcting variable passes through, from above to below, the individual saturation functions, which may be assigned to the constraints of the individual states 10a through 10d (from top to bottom: position, velocity, acceleration, as well as jerk). In this connection, one constraint cascade from above to below is shown in each of the first four diagrams. If different constraints are competing, that is, there is no solution for all of the constraints of the cascade, then the constraint, which occurs later in the cascade, is dominant, since these adaptations overwrite the preceding saturation steps. In this case, the specific state 10a-10d, which runs outside of the upper and lower constraints 8a through 8d and 9a through 9d, respectively, is drawn in as a dashed line. Due to the constraint cascade, these correcting variables running on the outside are adapted to the effect that they adhere to the constraints. This is shown by the solid lines of states 10a through 10d, which run inside of the upper and lower constraints 8a through 8d and 9a through 9d, respectively. The constrained trajectory 10e for the return path to predefined trajectory 2 results from the constraints 8a through 8d and 9a through 9d.

Figure 8:
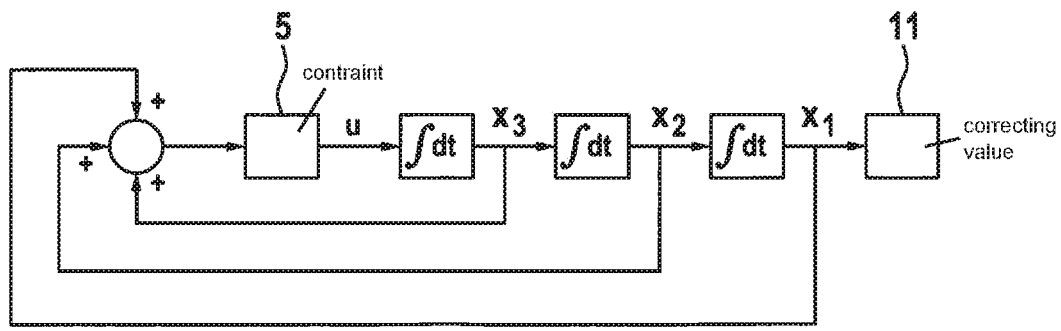
FIG. 8 shows an illustration of a control engineering sequence for calculating a state sum.

FIG. 8 shows a flow chart for calculating a state sum. For this, state $x_3$ may represent an acceleration, state $x_2$ may represent a velocity, and state $x_1$ may represent a position of the locomotive device. In this case, jerk u is not taken into account for calculating the state sum. In other words, jerk u receives a weighting summand of 0. A state sum of states $x_1$ through $x_3$ is calculated at the input of constraint 5. In this connection, each of these states $x_1$ through $x_3$ may have a different weighting. Depending on the desire as to which state should be taken into account more or less highly, the respective state may be weighted more or less heavily. The jerk is obtained as an output from constraint 5. This is integrated with respect to time, in order to obtain state $x_1$. In addition, state $x_1$ is integrated, in order to obtain state $x_2$, etc. In this connection, in particular, $x_1$ acts upon the controller of locomotive device 1. In this manner, in particular, a constrained correcting variable (11) may be determined for the controller for each instant t, in order to lead locomotive device 1 back to predefined trajectory 2.

What is claimed is:

1. A method for controlling an automated or autonomous transport or locomotive device, the method comprising:
   automatically ascertaining a deviation from a predefined trajectory, the deviation requiring a return of the locomotive device to the predefined trajectory;
   automatically calculating, in response to the automatic ascertainment, a jerk as an input variable, as a function of the deviation from the predefined trajectory;
   automatically calculating an unconstrained correcting variable for the return to the predefined trajectory, as a function of a weighted sum including weighted summands of states for the return, which is a function of the input variable;
   automatically calculating a constrained correcting variable regarding the jerk, by manipulating the unconstrained correcting variable, using a cascade that includes a plurality of stages having one saturation function per stage, each stage of the plurality of stages including a saturation function regarding a specific dynamic system state;
   integrating the constrained correcting variable with respect to time to obtain a constrained return trajectory to the predefined trajectory; and
   automatically steering, in response to the obtaining of the constrained return trajectory, the locomotive device to the predefined trajectory using the constrained return trajectory;
   wherein each saturation function corresponds to one predefined constraint, and
   wherein, if there is no physically meaningful solution for all of the constraints, then the constraint corresponding to the saturation function of a later stage in the cascade is prioritized over the constraint corresponding to a saturation function of an earlier stage in the cascade.

2. The method as recited in claim 1, wherein in each instance, the dynamic system state includes the jerk of the locomotive device and/or a velocity of the locomotive device and/or an acceleration of the locomotive device and/or a position of the locomotive device.

3. The method as recited in claim 1, wherein the constrained return trajectory includes a longitudinal component and/or a lateral component and/or a vertical component.

4. The method as recited in claim 1, wherein the cascade includes two to four stages.

5. The method as recited in claim 1, wherein the saturation function is ascertained invariantly over time.

6. The method as recited in claim 1, further comprising:
   sensorially detecting an obstacle, using the locomotive device, and on the basis of the sensorial detection, deviating from the predefined reference trajectory.

7. The method as recited in claim 1, further comprising:
   calculating a return matrix for the unconstrained correcting variable, using pole selection and/or using a linear quadratic regulator method.

8. The method as recited in claim 1, wherein the trajectory planning takes place the constrained return trajectory is obtained based on a linear state space representation of longitudinal dynamics and lateral dynamics.

9. The method as recited in claim 1, further comprising:
   adapting an unconstrained correcting variable in accordance with a prioritization of the constraints in the cascade, wherein if the constraints are not active at any moment, the cascade does not change the unconstrained correcting variable.

10. The method as recited in claim 1, wherein a resulting correcting variable is then applied to a model of longitudinal dynamics and lateral dynamics, and wherein the constrained correcting variable from an output of the saturation cascade is subsequently integrated three times to obtain the constrained trajectory.

11. The method as recited in claim 1, wherein longitudinal coordinates describe an arc length along the predefined trajectory, wherein a distance of the transport or locomotive device, that is perpendicular to the predefined trajectory, corresponds to lateral coordinates.

12. The method as recited in claim 11, wherein a triple integrator is used to describe dynamics, which is a deviation from the predefined trajectory in a Frenet coordinate system, and wherein the jerk is an input variable of the system.

13. The method as recited in claim 1, wherein the predefined trajectory is planned in a Frenet coordinate system, which is kinematically bound to a predefined trajectory by at least one base point and describes a setpoint position and a setpoint orientation of the transport or locomotive device at any time with respect to an inertial system.

14. An evaluation apparatus of an automated or autonomous transport or locomotive device, comprising:
an evaluation unit to control the locomotive device, and to perform the following:
automatically ascertaining a deviation from a predefined trajectory, the deviation requiring a return of the locomotive device to the predefined trajectory;
automatically calculating, in response to the automatic ascertainment, a jerk as an input variable, as a function of the deviation from the predefined trajectory;
automatically calculating an unconstrained correcting variable for the return to the predefined trajectory, as a function of a weighted sum including weighted summands of states for the return, which is a function of the input variable;
automatically calculating a constrained correcting variable regarding the jerk, by manipulating the unconstrained correcting variable, using a cascade that includes a plurality of stages having one saturation function per stage, each stage of the plurality of stages including a saturation function regarding a specific dynamic system state;
integrating the constrained correcting variable with respect to time to obtain a constrained return trajectory to the predefined trajectory; and
automatically steering, in response to the obtaining of the constrained return trajectory, the locomotive device to the predefined trajectory using the constrained return trajectory,
wherein each saturation function corresponds to one predefined constraint, and
wherein, if there is no physically meaningful solution for all of the constraints, then the constraint corresponding to the saturation function of a later stage in the cascade is prioritized over the constraint corresponding to a saturation function of an earlier stage in the cascade.

15. The evaluation apparatus as recited in claim 14, wherein the constrained return trajectory is obtained based on a linear state space representation of longitudinal dynamics and lateral dynamics.

16. The evaluation apparatus as recited in claim 14, wherein an unconstrained correcting variable is adapted in accordance with a prioritization of the constraints in the cascade, wherein if the constraints are not active at any moment, the cascade does not change the unconstrained correcting variable.

17. The evaluation apparatus as recited in claim 14, wherein a resulting correcting variable is then applied to a model of longitudinal dynamics and lateral dynamics, and wherein the constrained correcting variable from an output of the saturation cascade is subsequently integrated three times to obtain the constrained trajectory.

18. The evaluation apparatus as recited in claim 14, wherein longitudinal coordinates describe an arc length along the predefined trajectory, wherein a distance of the transport or locomotive device, that is perpendicular to the predefined trajectory, corresponds to lateral coordinates.

19. The evaluation apparatus as recited in claim 18, wherein a triple integrator is used to describe dynamics, which is a deviation from the predefined trajectory in a Frenet coordinate system, and wherein the jerk is an input variable of the system.

20. The evaluation apparatus as recited in claim 14, wherein the predefined trajectory is planned in a Frenet coordinate system, which is kinematically bound to a predefined trajectory by at least one base point and describes a setpoint position and a setpoint orientation of the transport or locomotive device at any time with respect to an inertial system.

* * * * *